United States Patent
Kobayashi et al.

(10) Patent No.: US 8,587,254 B2
(45) Date of Patent: Nov. 19, 2013

(54) RECHARGEABLE BATTERY CHARGING METHOD AND BATTERY PACK CAPABLE OF SUPPRESSING DETERIORATION DEGREE

(75) Inventors: Takao Kobayashi, Sumoto (JP); Toru Nishikawa, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 336 days.

(21) Appl. No.: 13/220,211

(22) Filed: Aug. 29, 2011

(65) Prior Publication Data

US 2012/0049804 A1    Mar. 1, 2012

(30) Foreign Application Priority Data

Sep. 1, 2010 (JP) ................. 2010-195900

(51) Int. Cl.
*H02J 7/00* (2006.01)
(52) U.S. Cl.
USPC ............................ 320/130; 320/150; 320/137
(58) Field of Classification Search
USPC ........................................................ 320/150
See application file for complete search history.

(56) References Cited

U.S. PATENT DOCUMENTS

| 6,930,465 | B2 | 8/2005 | Kishi et al. | |
| 6,972,545 | B2 * | 12/2005 | Tsuchiya et al. | 320/132 |
| 7,737,659 | B2 | 6/2010 | Morioka | |
| 2006/0186890 | A1 * | 8/2006 | Iwane et al. | 324/426 |
| 2008/0224667 | A1 | 9/2008 | Tanaka et al. | |

FOREIGN PATENT DOCUMENTS

| JP | 2002-236154 | 8/2002 |
| JP | 2008-5644 | 1/2008 |
| JP | 2008-228492 | 9/2008 |

* cited by examiner

*Primary Examiner* — Arun Williams
(74) *Attorney, Agent, or Firm* — Wenderoth, Lind & Ponack, L.L.P.

(57) ABSTRACT

One cycle is corrected every charging/discharging cycle in accordance with a cycle deterioration accelerating coefficient. The corrected one cycles are accumulated. A storage period is corrected in accordance with a storage deterioration accelerating coefficient every hour. The corrected storage periods are accumulated. In the storage period, a rechargeable battery is stored with the terminal voltage higher than a predetermined voltage. A deterioration coefficient is obtained as the product of a cycle deterioration coefficient calculated in accordance with the accumulated cycle number, and a storage deterioration coefficient calculated in accordance with the accumulated value of the storage periods (Step S42). If the deterioration coefficients falls within the range 0.3 to 0.7 (Step S43, 44: NO), the setting voltage in constant-voltage and constant-current charging operation is decreased from 4.2 to 4.1 V (S45). If it is smaller than 0.3 (S43: NO, S44: YES), the setting voltage is decreased to 3.8 V (S46).

7 Claims, 14 Drawing Sheets

RECHARGEABLE BATTERY CHARGING METHOD AND BATTERY PACK CAPABLE OF SUPPRESSING DETERIORATION DEGREE

BACKGROUND OF THE INVENTION

1. Field of the Invention

The present invention relates to a method for charging a rechargeable battery at a constant voltage and a constant current, and a battery pack that charges a rechargeable battery based on this method.

2. Description of the Related Art

In the case where rechargeable batteries, typically, lithium ion batteries are charged, the batteries are charged at a constant current with the maximum of terminal voltage being limited to a setting voltage (constant current charging stage), while after the terminal voltage reaches the setting voltage the batteries are charged at a constant voltage (constant voltage charging stage). This charging method is referred to as constant-current and constant-voltage charging method, and is often used for rechargeable batteries. In some of this type of charging methods, before the charging operation is switched from the constant current charging stage to the constant voltage charging stage, the charging voltage or the charging current is gradually reduced. On the other hand, rechargeable batteries will be gradually deteriorated with the number of repeated charging/discharging cycles or if the rechargeable batteries are left standing (stored) for a long time after charged. If the deterioration degree of a rechargeable battery gets larger, the fully-charged capacity (FCC: Full Charge Capacity) or the safety may decrease. For this reason, it is important to grasp the degree of deterioration of rechargeable battery and to suppress the deterioration degree.

The life of a rechargeable battery can be determined by the degree of deterioration of rechargeable battery. The actual capacity (capacity equivalent to FCC) of a rechargeable battery is a capacity which can be substantially discharged from the rechargeable battery. The life and the actual capacity of a rechargeable battery will decrease with the number of repeated charging/discharging cycles or if the rechargeable battery is left standing for a long time. However, there is a tendency that the life and the actual capacity of a rechargeable battery will also decrease with the value(s) of setting voltage and/or setting current in charging operation. To address this, Japanese Patent Laid-Open Publication No. JP 2008-5644 A discloses a method that, in order to reduce (decrease) of actual capacity and increase the life of a rechargeable battery, decreases the setting voltage with the number of repeated charging/discharging cycles of the rechargeable battery.

Also, JP 2008-228492 A discloses a method which detects any of the internal resistance, actual capacity (learning capacity) and the number of charging/discharging cycles of a rechargeable battery to determine the deterioration state (degree of deterioration) of the rechargeable battery, and decreases the setting voltage depending on the determined deterioration state. In addition, JP 2002-236154 A discloses a method that corrects the decrease of the setting voltage by reducing the leaning capacity in accordance with the counted number of charging cycles and the elapsed storage time of the battery.

However, in the method disclosed in JP 2008-5644 A, since the setting voltage is decreased simply depending on the counted number of the charging/discharging cycles or the accumulated value of the charged/discharged capacities (capacities which are charged and/or discharged), even if the life of the rechargeable battery can be longer, the setting voltage is decreased without evaluation of the actual degree of deterioration. Also, in the method disclosed in JP 2008-228492, although a table or function is predetermined by modeling relationship between the deterioration state and the indices (e.g., internal resistance, actual capacity, and the number of charging/discharging cycles of the rechargeable battery) so that the deterioration state is determined based on the table or function, the decrease of setting voltage is not taken into consideration when the deterioration state is determined. Also, in the method disclosed in JP 2002-236154, this method is aimed at accurately correcting the learning capacity but is not directed to suppress the deterioration degree of the rechargeable battery.

SUMMARY OF THE INVENTION

The present invention is aimed at solving the problem. It is an object of the present invention to provide a rechargeable battery charging method capable of suppressing the deterioration degree of a rechargeable battery in consideration of the deterioration state that varies in accordance with the decrease of setting voltage and setting current, and a battery pack capable of charging a rechargeable battery using this charging method.

A rechargeable battery charging method according to the present invention is a method for charging a rechargeable battery at a constant voltage and a constant current based on a setting voltage and a setting current. The method includes an increment calculating step, a determining step, a correcting step, an accumulating step, a deterioration coefficient calculating step, and a decreasing step. In the increment calculating step, an increment of each of one or more indices is calculated which increases with the operation amount of the rechargeable battery or elapsed time. In the determining step, a deterioration accelerating coefficient is determined corresponding to the calculated increment of each of the indices. In the correcting step, the calculated increment of each of the indices is corrected by multiplying the calculated increment of each of the indices by the determined deterioration accelerating coefficient. In the accumulating step, the corrected increments of each of the indices are accumulated. In the deterioration coefficient calculating step, each of one or more deterioration coefficients is calculated which is decreased in accordance with the increase of the accumulated value of the increments of each of the indices. In the decreasing step, the setting voltage and/or setting current is decreased in accordance with the decrease of the calculated deterioration coefficient.

In the rechargeable battery charging method according to the present invention, if the calculated one deterioration coefficient, or the product of more than one deterioration coefficients is smaller than a predetermined value, the setting voltage can be decreased to a predetermined voltage.

In the rechargeable battery charging method according to the present invention, the indices can include the number of charging/discharging cycles. In this method, the determined deterioration accelerating coefficient corresponding to the calculated increment of the number of charging/discharging cycles is changed to a higher/lower value in accordance with the higher/lower value(s) of the setting voltage and/or setting current.

In the rechargeable battery charging method according to the present invention, the indices can include the period of left-standing time in which the terminal voltage is not smaller than a predetermined terminal voltage. In this method, the determined deterioration accelerating coefficient corresponding to the calculated increment of the period of left-standing time is changed to a higher/lower value in accordance with the higher/lower value of the terminal voltage.

The rechargeable battery charging method according to the present invention can further include a detecting step, a temperature increase coefficient determining step, and a further correcting step. In the detecting step, the temperature of the rechargeable battery is detected before accumulating the increments of the period of left-standing time every when accumulating the increments of the period of left-standing time. In the temperature increase coefficient determining step, a temperature increase coefficient is determined which is changed to a higher/lower value in accordance with the higher/lower value of the detected temperature. In further correcting step, the corrected increment of the period of left-standing time is further corrected by multiplying the corrected increment of the period of left-standing time by the determined temperature increase coefficient. The corrected increment of the period of left-standing time has been corrected by multiplying the calculated increment of the period of left-standing time by the deterioration accelerating coefficient.

A battery pack according to the present invention is a battery pack for charging a rechargeable battery at a constant voltage and a constant current based on a setting voltage and a setting current. The battery pack includes an increment calculating portion, a determining portion, a correcting portion, an accumulating portion, a deterioration coefficient calculating portion, and a decreasing portion. The increment calculating portion calculates an increment of each of one or more indices that increases with the operation amount of the rechargeable battery or elapsed time. The determining portion determines a deterioration accelerating coefficient corresponding to the calculated increment of each of the indices, which is calculated by the calculating portion. The correcting portion corrects the calculated increment of each of the indices by multiplying the calculated increment of each of the indices by the determined deterioration accelerating coefficient. Again, the calculated increment of each of the indices is calculated by the calculating portion. Also, again, the determined deterioration accelerating coefficient is determined by the determining portion. The accumulating portion accumulates the corrected increments of each of the indices, which is corrected by the correcting portion. The deterioration coefficient calculating portion calculates each of one or more deterioration coefficients that is decreased in accordance with the increase of the accumulated value of the increments of each of the indices, which is accumulated by the accumulating portion. The decreasing portion decreases the setting voltage and/or setting current in accordance with the decrease of the calculated deterioration coefficient, which is calculated by the calculating portion.

The battery pack according to the present invention further includes a cycle counting portion, a time counting portion, a temperature detecting portion, a temperature increase coefficient determining portion, and a corrected increment of period of left-standing time further correcting portion. The cycle counting portion counts the number of charging/discharging cycles of the rechargeable battery. The time counting portion counts the period of left-standing time. The rechargeable battery is left standing with the terminal voltage being a predetermined terminal voltage in the period of left-standing time. The indices include the number of charging/discharging cycles, and the period of left-standing time. Again, the number of charging/discharging cycles is counted by the cycle counting portion. Also, again, the period of left-standing time is counted by the time counting portion. The determining portion changes the determined deterioration accelerating coefficient corresponding to the increment of the number of charging/discharging cycles to a higher/lower value in accordance with the higher/lower value(s) of the setting voltage and/or setting current. The determining portion changes the determined deterioration accelerating coefficient corresponding to the increment of the period of left-standing time to a higher/lower value in accordance with the higher/lower value of the terminal voltage. The temperature detecting portion detects the temperature of the rechargeable battery before the accumulating portion accumulates the corrected increments of the period of left-standing time every when the accumulating portion accumulates the corrected increments of the period of left-standing time. The temperature increase coefficient determining portion determines a temperature increase coefficient that is changed to a higher/lower value in accordance with the higher/lower value of the detected temperature, which is detected by the temperature detecting portion. The corrected increment of period of left-standing time further correcting portion further corrects the corrected increment of the period of left-standing time by multiplying the corrected increment of the period of left-standing time by the determined temperature increase coefficient. Again, the determined temperature increase coefficient is determined by the temperature increase coefficient determining portion. The corrected increment of the period of left-standing time has been corrected by the correcting portion.

In the present invention, a deterioration accelerating coefficient is previously prepared corresponding to each of one or more indices that increases with the operation amount of a rechargeable battery or the elapsed of time. For example, the deterioration accelerating coefficient can be changed in accordance with a voltage parameter relating to the index. In addition, a deterioration coefficient can be calculated which is decreased in accordance with the increase of the indices. Also, a setting voltage and/or a setting current is previously prepared which is decreased in accordance with the decrease of the calculated deterioration coefficient. In the case where more than one deterioration coefficients are calculated, a setting voltage and/or a setting current is previously prepared which is decreased in accordance with the decrease of the product of the more than one deterioration coefficients, for example.

Under the preparation, a deterioration accelerating coefficient is determined corresponding to the increment of each of the one or more indices. Also, the increment of each of the indices is corrected by multiplying the increment of each of the indices by the determined deterioration accelerating coefficient. Also, the corrected increments of each of the indices are accumulated. Also, each of one or more deterioration coefficients is calculated in accordance with the accumulated value of the increments of each of the indices. In the case where one deterioration coefficient is calculated, the setting voltage and/or setting current is decreased in accordance with the decrease of the calculated deterioration coefficient. In the case where more than one deterioration coefficients are calculated, a setting voltage and/or setting current decreased in accordance with the decrease of the product of the more than one deterioration coefficients, for example.

Thus, the increment of each of the one or more indices is corrected in accordance with the determined deterioration accelerating coefficient. Also, the corrected increments of each of the indices are accumulated. Also, the deterioration coefficient is changed to a lower/higher value in accordance with the higher/lower value of the accumulated value of each of the indices. Also, the setting voltage and/or setting current is decreased in accordance with the calculated deterioration coefficient or the product of the calculated deterioration coefficients. Accordingly, every when the setting voltage and/or setting current is decreased in accordance with deterioration degree, the deterioration accelerating coefficient corresponding to the calculated increment of each of the one or more indices is set smaller than the deterioration accelerating coefficient before the setting voltage and/or setting current is decreased in accordance with deterioration. In other words, the deterioration accelerating coefficient is determined so that the decrease rate of the deterioration coefficient with the increase of the index gets smaller with the decrease of setting voltage and/or setting current.

In the present invention, if the calculated deterioration coefficient of one index, or the product of the calculated deterioration coefficients of more than one indices is smaller than a predetermined value, the setting voltage can be decreased to a voltage corresponding to a higher safety degree in charging operation.

In this case, if the deterioration of the rechargeable battery reaches a certain degree, the setting voltage is decreased to a large degree. As a result, it is possible to sufficiently the risk that safety problems arise.

In the present invention, the number of charging/discharging cycles of the rechargeable battery can be included as at least one of the indices which increase with the operation amount of the rechargeable battery or elapsed time. In this case, the determined deterioration accelerating coefficient corresponding to the increment of the number of charging/discharging cycles that is determined in accordance with a factor is changed to a higher/lower value in accordance with the higher/lower value of the setting voltage and/or setting current at timing of the determination.

According to this method, the deterioration coefficient of the rechargeable battery is calculated in accordance with the setting voltage and/or setting current, and the number of charging/discharging cycles, which is one of the indices which most greatly affect deterioration of the rechargeable battery. For this reason, the deterioration state of the rechargeable battery can be properly evaluated. As a result, it is possible to suppress the deterioration degree.

In the present invention, a period of left-standing time can be included as at least one of the indices which increase with the operation amount of the rechargeable battery or elapsed time. In the period of left-standing time, the rechargeable battery is left standing with the terminal voltage being not smaller than a predetermined terminal voltage. The determined deterioration accelerating coefficient corresponding to the increment of the period of left-standing time is determined based on a factor that is changed to a higher/lower value in accordance with the higher/lower value of the terminal voltage of the rechargeable battery at timing of the determination.

According to this method, the deterioration coefficient of the rechargeable battery is calculated based on the terminal voltage during the period of left-standing time, and the period of left-standing time, which is one of the indices which most greatly affect deterioration of the rechargeable battery. For this reason, the deterioration state of the rechargeable battery can be properly evaluated. As a result, it is possible to suppress the deterioration degree.

In the present invention, a temperature increase coefficient can be previously prepared which is changed to a higher/lower value in accordance with the higher/lower value of the temperature of the rechargeable battery. The temperature of the rechargeable battery is detected before the period of left-standing time is incremented every when the period of left-standing time is incremented, and a temperature increase coefficient is determined in accordance with the detected temperature of the rechargeable battery. The increment of the period of left-standing time is corrected by multiplying the increment of the period of left-standing time by the determined temperature increase coefficient and the deterioration accelerating coefficient, which is determined in accordance with the setting voltage or setting current.

According to this method, the calculation of the deterioration coefficient reflects the deterioration characteristics of the rechargeable battery that the deterioration degree gets higher with the battery temperature during the period corresponding to the increment of the period of left-standing time.

According to the present invention, a deterioration accelerating coefficient corresponding to the increment of each of the one or more indices of a rechargeable battery is corrected by multiplying the deterioration accelerating coefficient by the increment of each of each of the one or more indices. Also, the corrected increments of each of the indices are accumulated. Also, a deterioration coefficient is calculated in accordance with the accumulated value of each of indices. Also, the setting voltage and/or setting current is decreased in accordance with the calculated deterioration coefficient or the product of the calculated deterioration coefficients.

Thus, the increment of each of the one or more indices is corrected in accordance with the determined deterioration accelerating coefficient. Also, the corrected increments of each of the indices are accumulated. Also, the deterioration coefficient is changed to a lower/higher value in accordance with the higher/lower value of the accumulated value of each of the indices. Also, the setting voltage and/or setting current is decreased in accordance with the calculated deterioration coefficient or the product of the calculated deterioration coefficients. Accordingly, every when the setting voltage and/or setting current is decreased in accordance with the degree of deterioration, the deterioration accelerating coefficient corresponding to the calculated increment of each of the one or more indices is set smaller than the deterioration accelerating coefficient before the setting voltage and/or setting current is decreased in accordance with deterioration. In other words, the deterioration accelerating coefficient is determined so that the decrease rate of the deterioration coefficient gets smaller with the decrease of setting voltage and/or setting current. The decrease rate of the deterioration coefficient is decreased in accordance with the increase of the index.

Therefore, it is possible to suppress the deterioration of the rechargeable battery in consideration of the deterioration state that varies in accordance with the decrease of setting voltage and setting current.

The above and further objects of the present invention as well as the features thereof will become more apparent from the following detailed description to be made in conjunction with the accompanying drawings.

DETAILED DESCRIPTION OF THE EMBODIMENT(S)

The following description will describe embodiments according to the present invention with reference to the drawings.

Figure 1:
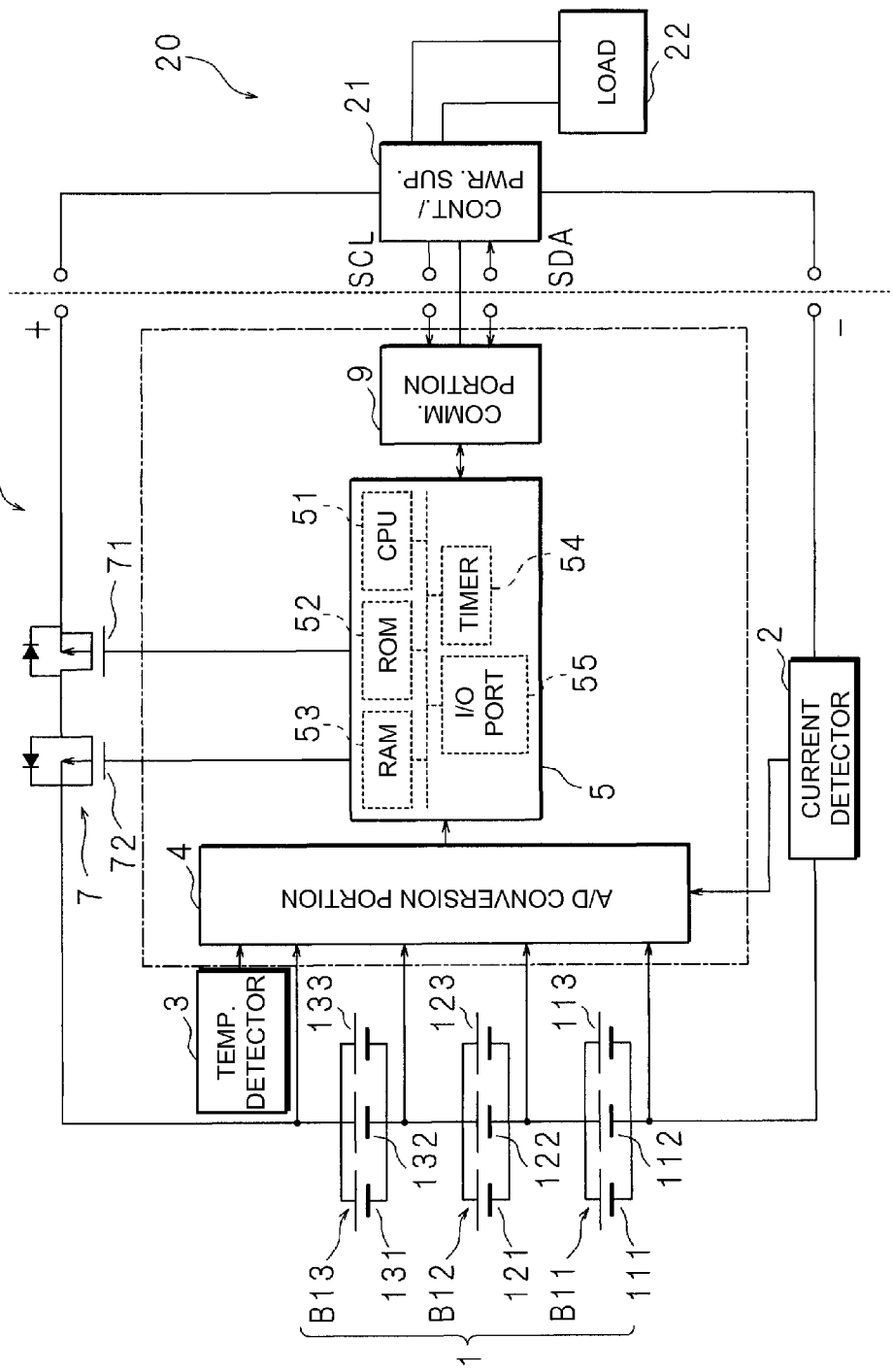
FIG. 1 is a block diagram showing the exemplary construction of a battery pack according to an embodiment of the present invention.

FIG. 1 is a block diagram showing the exemplary construction of a battery pack according to an embodiment of the present invention. The battery pack includes a battery pack 10. The battery pack 10 is detachably attached to a load device 20 such as personal computer (PC) and personal digital assistant. The battery pack 10 includes a battery 1. The battery 1 includes battery blocks B11, B12 and B13 that are serially connected to each other in this order. Each of the battery blocks B11, B12 and B13 includes three battery cells of lithium-ion rechargeable batteries 111, 112 and 113, 121, 122 and 123, or 131, 131 and 131 that are connected to each other in parallel. The positive terminal of the battery block B13 and the negative terminal of the battery block B11 serve as the positive terminal and the negative terminal of the battery 1, respectively.

The voltages of the battery block B11, B12 and B13 independently are provided to an analog input terminal of an A/D conversion portion 4, and are converted into digital voltage values. The converted voltage values are provided from a digital output terminal of the A/D conversion portion 4 to a control portion 5 composed of a microcomputer. In addition, the analog input terminal of the A/D conversion portion 4 is provided with the output of a temperature detector 3 and the detecting output of a current detector 2. The temperature detector 3 is arranged in proximity to the battery 1, and detects the temperature of the battery 1 by means of a circuit including a thermistor. The current detector 2 is connected to the negative terminal of the battery 1 on the charging/discharging line, and includes a resistor that detects the charging/discharging current of the battery 1. These detection outputs are converted into digital detecting values, and are provided from the digital output terminal of the A/D conversion portion 4 to the control portion 5.

A circuit breaker 7 is connected to the positive terminal side of the battery 1 on the charging/discharging line. The circuit breaker 7 is composed of P-channel type MOSFETs 71 and 72 that cut off charging current and discharging current, respectively. The MOSFETs 71 and 72 are serially connected to each other with their drain terminals being directly connected to each other. Diodes are shown between the drain and source terminals of the MOSFETs 71 and 72. The diodes correspond to parasitism diodes (body diodes) of the MOSFETs 71 and 72.

The control portion 5 includes a CPU 51. The CPU 51 is connected via the bus to a ROM 52, a RAM 53, a timer 54, and an I/O port 55. The ROM 52 stores information such as program. The RAM 53 temporarily stores created information. The timer 54 counts time. The I/O Port 55 provides/receives signals to/from portions of the battery pack 10. The I/O Port 55 is connected to the digital output terminal of the A/D conversion portion 4, the gate terminals of the MOSFETs 71 and 72, and a communication portion 9. The communication portion 9 communicates with the control/power-supply portion 21 (charger) included in the load device 20. The ROM 52 is a nonvolatile memory composed of EEPROM (Electrically Erasable Programmable ROM) or flash memory. In addition to the program, the ROM 52 can store a learning value of battery capacity, the number of charging/discharging cycles, a period of storage time, initial capacity (i.e., the nominal capacity), setting voltage, setting current, and various setting data.

The CPU 51 executes processing including calculation, providing/receiving and the like based on the control program previously stored in the ROM 52. For example, the CPU 51 reads the voltage values of the battery blocks B11, B12 and B13, and the detected value of the charging/discharging current of the battery 1 periodically at 250 ms, and integrates the remaining capacities of the battery 1 based on the read voltage values and detected values. The CPU 51 stores the integrated remaining capacity value in the RAM 53. Also, the CPU 51 creates remaining capacity data, and writes the created data in a register (not shown) in the communication portion 9. Thus, the remaining capacity data can be provided from the communication portion 9.

In the circuit breaker 7, when an ON signal with L (low) level is provided from the I/O Port 55 to the gate terminals of the MOSFETs 71 and 72 in normal charging/discharging operation, current can flow between the drain terminal and the source terminal of each of the MOSFETs 71 and 72. In the case where charging current to the battery is cut off, an OFF signal with H (high) level is provided from the I/O Port 55 to the gate terminal of the MOSFET 71 so that current cannot flow between the drain terminal and the source terminal of the MOSFET 71. In the case where discharging current from the battery 1 is cut off, an OFF signal with H (high) level is provided from the I/O Port 55 to the gate terminal of the MOSFET 72 so that current cannot flow between the drain terminal and the source terminal of the MOSFET 72. In the case where the battery 1 is in a suitably-charged state, both the MOSFETs 71 and 72 of the circuit breaker 7 are in the ON state so that the battery 1 can be charged/discharged.

The load device 20 includes a load 22 connected to the control/power-supply portion 21. The control/power-supply portion 21 is supplied with electric power from the commercial power (not shown) to drive the load 22 and to supply charging current through the charging/discharging line to the battery 1. On the other hand, if electric power from the commercial power stops being supplied, the control/power-supply portion 21 drives the load 22 with discharging current supplied through the charging/discharging line from the battery 1. In the case where the battery 1 to be charged by the control/power-supply portion 21 is a lithium-ion battery, the battery 5 is charged in two stages that charge the battery 1 at a constant current (Max current of about 0.5 to 1 C) and constant voltage (Max about 4.2 to 4.4 V/battery cell). When the battery voltage of the battery 1 rises to a predetermined value or higher, and when the charging current of the battery 1 drops to a predetermined value or lower, it is determined that the battery 1 is fully charged.

The control/power-supply portion 21, and the control portion 5 (including the communication portion 9) are specified as master and slave, respectively. Thus, the control/power-supply portion 21 and the communication portion 9 communicate with each other by using a communication method such as SMBus (System Management Bus) method. In this embodiment, the serial clock (SCL) is supplied from the control/power-supply portion 21. Serial data (SDA) is bidirectionally transmitted between the control/power-supply portion 21 and the communication portion 9. In this embodiment, the control/power-supply portion 21 reads the information in the aforementioned register in the communication portion 9 by polling the communication portion 9 periodically at 2 seconds. Thus, the remaining capacity data of the battery 1 is provided by this polling periodically at 2 seconds from the communication portion 9 to the control/power-supply portion 21. A display (not shown) included in the load device 20 can indicate the remaining capacity value N.

The aforementioned polling period of 2 seconds can be set by the control/power-supply portion 21.

The remaining capacity of the battery 1 can be calculated by subtracting the discharged capacity of the battery 1 from the learning capacity of the battery 1 (represented in Ah or Wh). Thus, the remaining capacity of the battery 1 is represented by the integrated amount of current or electric power. In this embodiment, the remaining capacity is represented in percentage (%) where the learning capacity is defined as 100%. The learning capacity of the battery 1 can be the integrated amount of discharging current or discharging electric power in discharging operation from the fully-charged state of the battery 1 to a discharging stop voltage. Alternatively, the learning capacity of the battery 1 can be the integrated amount of charging current or charging electric power in charging operation from the discharging stop voltage to the fully-charged state.

The battery 1 will be gradually deteriorated as charging/discharging operation is repeated. The following description describes a process for calculating a cycle deterioration coefficient by counting the number of charging/discharging cycles of the battery 1 (hereinafter simply referred to as cycle number). The cycle deterioration coefficient represents the degree of deterioration of the battery 1.

The cycle number is incremented by one every when the integrated amount of discharging operation reaches a capacity corresponding to the initial capacity (i.e., the nominal capacity). Alternatively, the cycle number may be incremented by one every when the integrated amount of charging operation and discharging operation reaches a capacity corresponding to the initial capacity of the battery 1.

Figure 2:
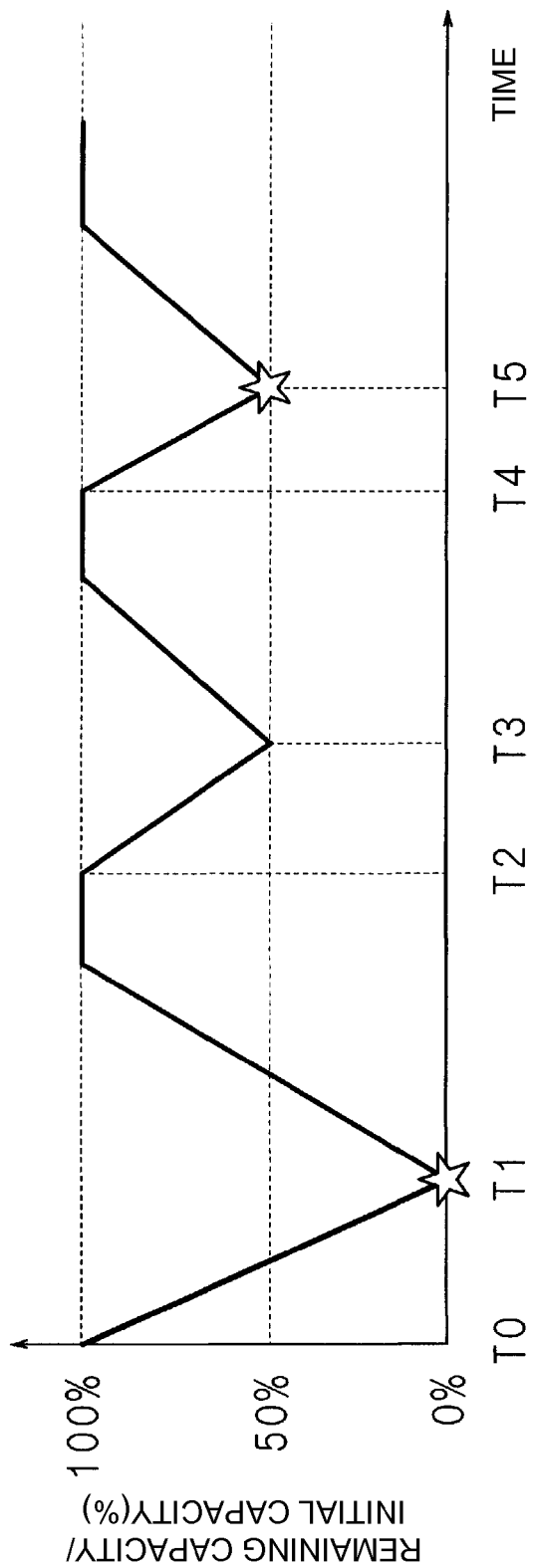
FIG. 2 is a chart illustrating a battery cycle counting method for counting the number of cycles of a battery.

FIG. 2 is a chart illustrating a battery cycle counting method for counting the cycle number of the battery 1. The horizontal axis of FIG. 2 indicates the elapsed time. The vertical axis indicates the ratio of the remaining capacity relative to the initial capacity of the battery 1. The star marks shown in this figure indicate a point of the increment of the cycle number (=one cycle). The cycle number is counted by accumulating the increments of cycle number. After the battery 1 is charged to the fully-charged state so that the remaining capacity of the battery 1 is 100%, the battery 1 starts being discharged at time T0. The remaining capacity gets 0%, in other words, the integrated value of the discharged amount reaches the initial capacity at time T1 so that the cycle number is incremented by one. Subsequently, the battery 1 is charged again to the fully-charged state. The battery 1 is discharged from time T2 to T3 so that the remaining capacity gets 50%. Subsequently, the battery 1 is charged again to the fully-charged state. After that, when the battery 1 is discharged from time T4 to T5 so that the remaining capacity gets 50%, the cycle number is incremented by one. In this case, since discharging operation of 50% is performed twice, the integrated value of discharged amounts reaches the initial capacity.

The relationship is now described between the cycle number and actual capacity (i.e., FCC) of the battery 1.

Figure 3:
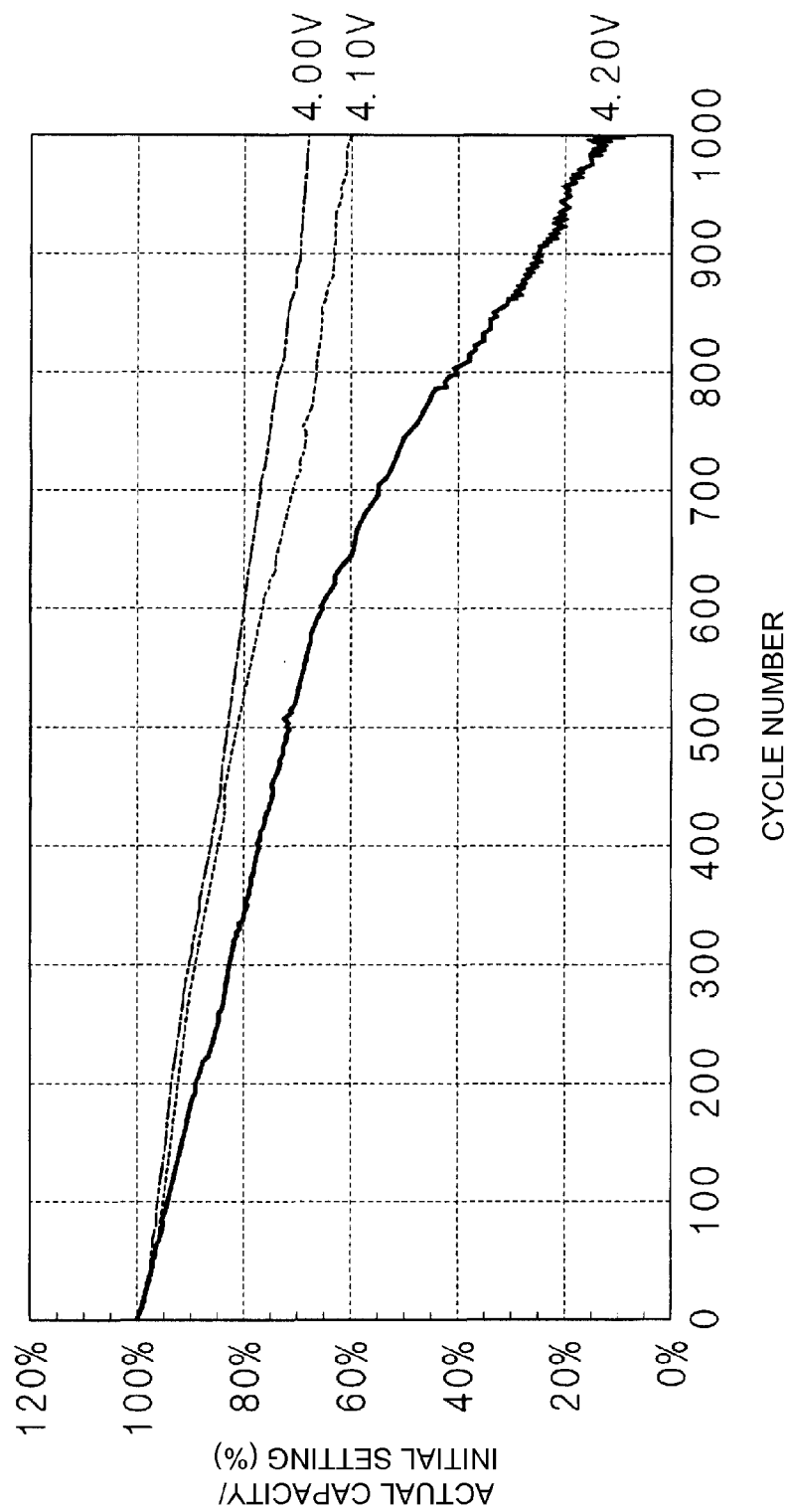
FIG. 3 is a graph showing the decrease of the actual capacity of a battery with the increase of the number of cycles of the battery.

FIG. 3 is a graph showing the decrease of the actual capacity of a battery with the cycle number of the battery 1. The horizontal axis of FIG. 3 indicates the cycle number. The vertical axis indicates the ratio of the actual capacity relative to the initial capacity. The solid line, dashed line, and single-dot-dashed line in this figure indicate setting voltage of 4.20 V, 4.10 V and 4.00 V, respectively.

As can be seen from FIG. 3, in the case where the setting voltage is set lower, it is possible to suppress the decrease of the actual capacity with the increase of the cycle number (i.e., acceleration of deterioration state). Specifically, for example, in the range of 100% to 60% in the ratio of actual capacity relative to initial capacity, it can be seen that, in the case where the setting voltage is decreased from 4.20 V to 4.10 V, the cycle number is increased about 1.5 times which brings the actual capacity to the same decreased ratio. Needless to say, the degree of the increase of cycle number will vary in accordance with the characteristics of the battery 1. In other words, it can be said that, in the case where the setting voltage is decreased from 4.20 V to 4.10 V, a ratio is decreased from 1.0 to 0.7 ($\approx$1/1.5), the ratio being represented by the acceleration of actual capacity decrease with cycle number (hereinafter, referred to as cycle deterioration accelerating coefficient). Thus, in the case where the setting voltage is set at 4.10 V, the cycle deterioration accelerating coefficient is determined as 0.7. In the case where the setting voltage is set to 4.00 V, the cycle deterioration accelerating coefficient is determined as a value smaller than 0.7.

Decrease of the actual capacity with the cycle number can be also suppressed by decreasing the setting current.

Figure 4:
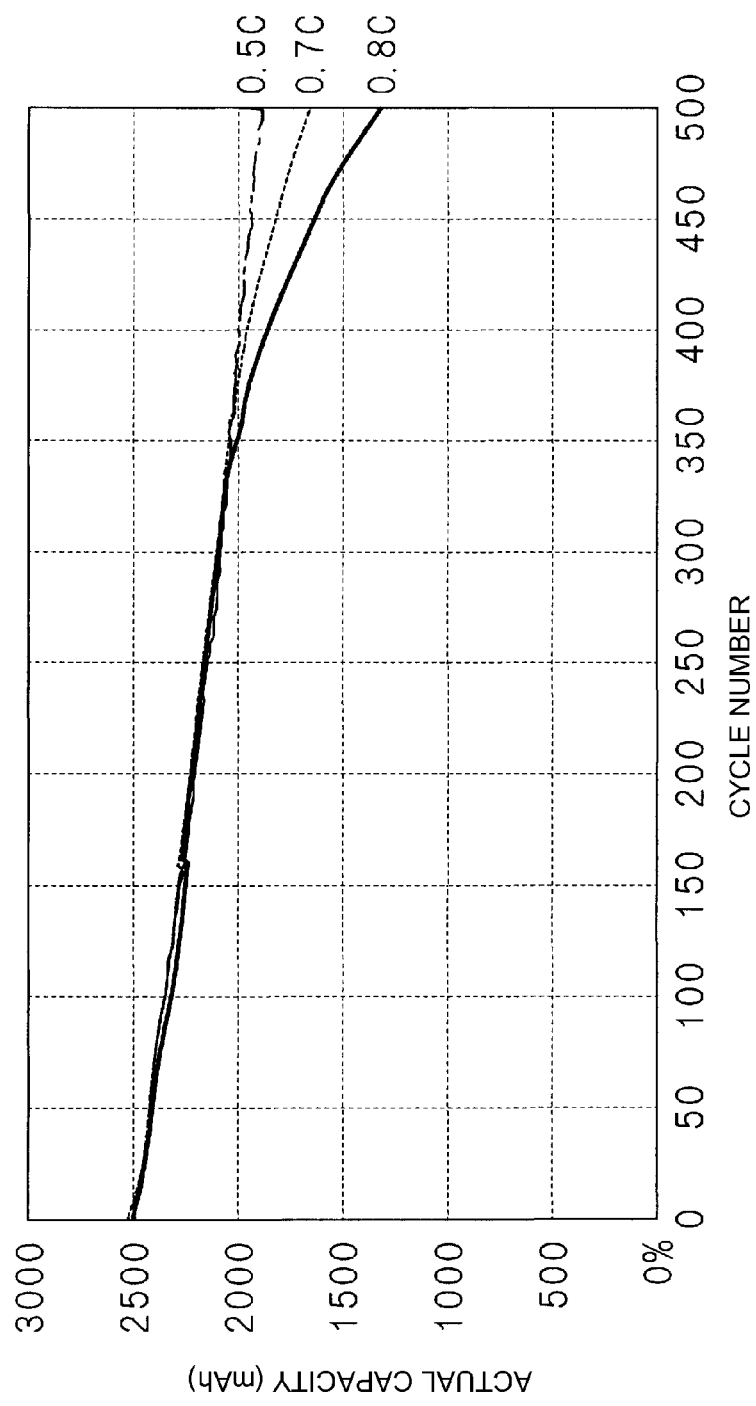
FIG. 4 is a graph showing the decrease of the actual capacity of a battery with the increase of the number of cycles of the battery.

FIG. 4 is a graph showing the decrease of the actual capacity of a battery with the cycle number of the battery 1. The horizontal axis of FIG. 4 indicates the cycle number. The vertical axis indicates the absolute value of actual capacity. The solid line, dashed line, and single-dot-dashed line in this figure indicate setting current is 0.8 C, 0.7 C and 0.5 C, respectively. "C" indicates charging/discharging hour rate. For example, 1 C refers to a current value (mA) that can be supplied for 1 hour by the electric amount corresponding to the capacity (mAh) of each of the battery blocks B11, B12 and B13. In particular, FIG. 4 shows that, in the range where the cycle number exceeds 350, in the case where the setting current is decreased from 0.8 C to 0.7 C and to 0.5 C, actual capacity decrease is suppressed.

In this embodiment, it is illustratively described that actual capacity decrease is suppressed by decreasing the setting voltage.

However, there is a possibility that, as the counted cycle number is increased, the setting voltage is gradually changed (hereinafter, the same goes for setting current). For this reason, the aforementioned cycle deterioration accelerating coefficient is required to be determined every when the cycle number is incremented (in this case every one cycle). The value of cycle deterioration accelerating coefficient is defined as 1 in the case where the setting voltage is 4.20 V. Accordingly, the increment of the cycle number in the case of setting voltage 4.10 V or 4.00 V can be converted into the increment in the case of setting voltage 4.20 V by multiplying the increment in the case of setting voltage 4.10 V or 4.00 V by a corresponding cycle deterioration accelerating coefficient which is determined in accordance with the setting voltage which is set at timing of the determination. The corresponding cycle deterioration accelerating coefficient in the case of setting voltage 4.10 V or 4.00 V is smaller than 1. Thus, the increment to be accumulated is relatively set smaller with the decrease of setting voltage. As a result, the accumulated value of the increments of the cycle number becomes smaller, which in turn delays actual capacity decrease.

Calculation is now described which calculates the ratio of actual capacity relative to initial capacity (hereinafter, referred to as cycle deterioration coefficient) based on the accumulated value of the converted cycle number which is obtained as in the case of setting voltage 4.20 V by the conversion.

Figure 5:
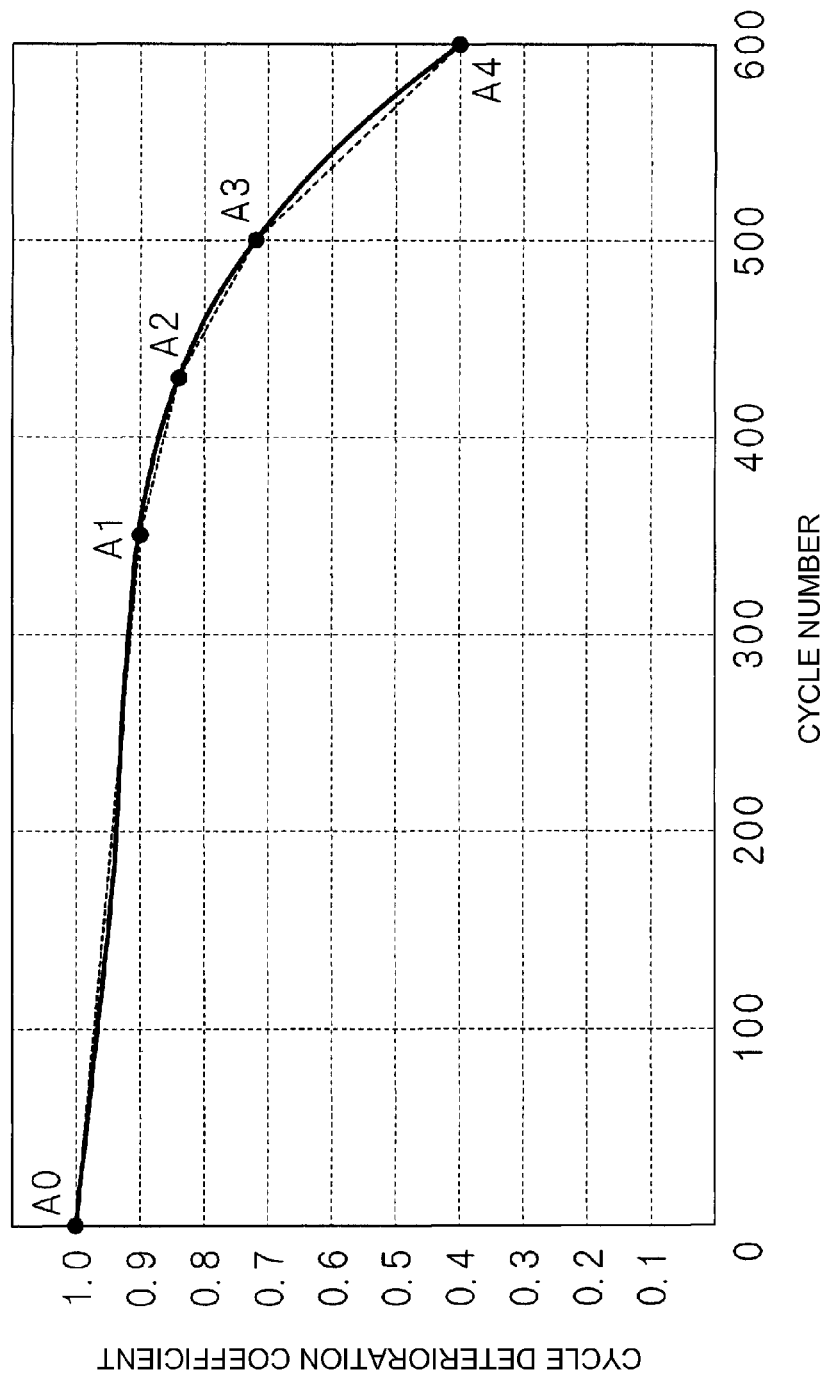
FIG. 5 is a graph schematically showing the decrease of a cycle deterioration coefficient with the increase of the number of cycles of the battery.

FIG. 5 is a graph schematically showing the decrease of a cycle deterioration coefficient with the cycle number of the battery 1. The horizontal axis of FIG. 5 indicates the cycle number. The vertical axis indicates the cycle deterioration coefficient. This figure illustratively shows the variation of the cycle deterioration coefficient. The dashed line is composed of straight-line segments which connect five points A0 to A4 on the curved line to each other, and approximately represents the curved line. In this embodiment, the coordinates of the points A0 to A4 are previously stored in the ROM 52 for calculation of the cycle deterioration coefficient in accordance with cycle number. The cycle deterioration coefficient corresponding to any cycle number can be calculated by linear interpolation. The cycle deterioration coefficient may be calculated or determined by a method other than linear interpolation.

The aforementioned processes are now described in detail with reference to a flowchart.

Figure 6:
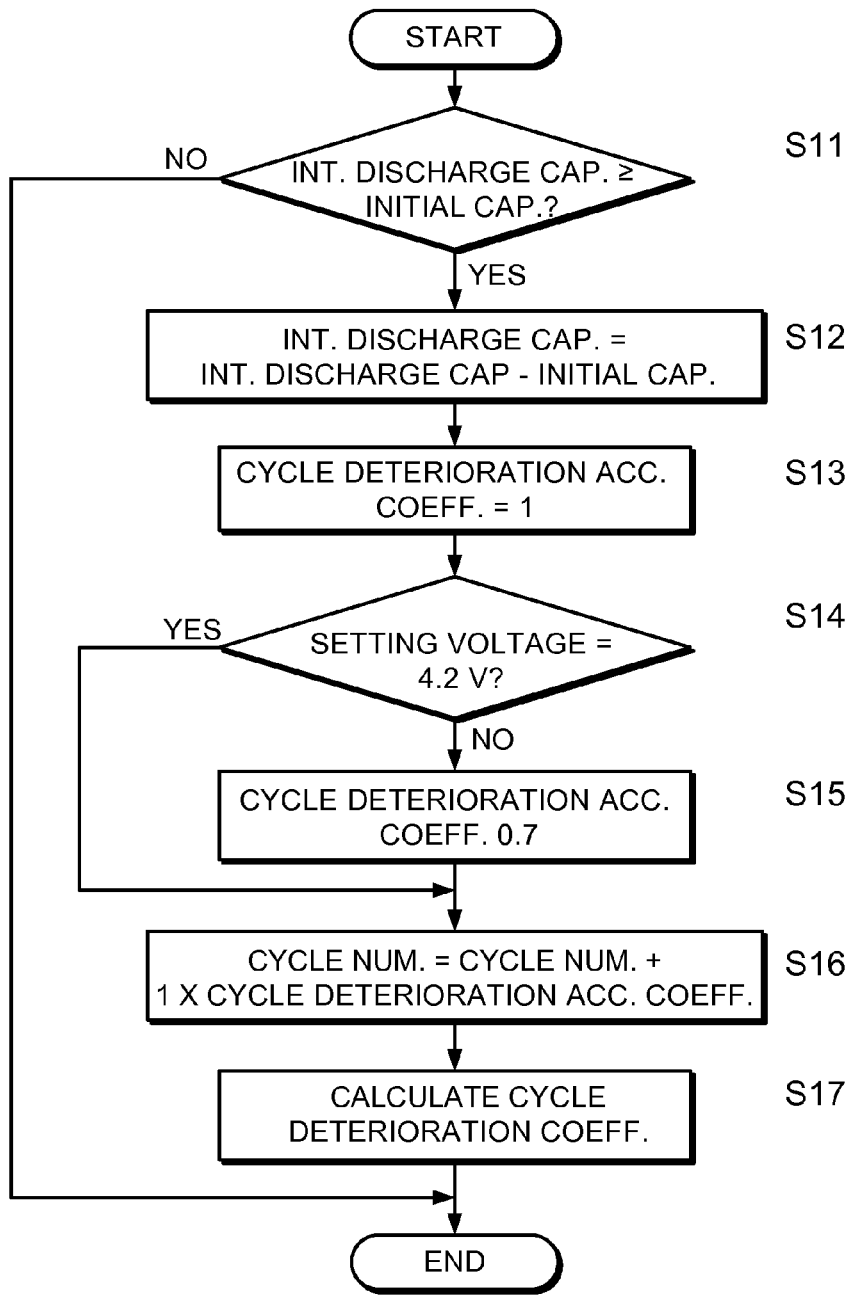
FIG. 6 is a flowchart showing the procedure of a CPU that calculates the cycle deterioration coefficient every when the number of the cycles is incremented.

FIG. 6 is the flowchart showing the procedure of the CPU 51 which calculates the cycle deterioration coefficient every when the cycle number is incremented. The following process is performed periodically at a period of 250 ms by the CPU 51 based on the control program which is previously stored in the ROM 52 (the same goes for other procedure).

The integrated discharged capacity is the integrated value of the discharging amount of the battery 1. For example, a process other than the following process is performed periodically at a period of 250 ms for integrating the discharging amount of the battery 1 so that the integrated value is stored in the RAM 53. The cycle deterioration accelerating coefficient and the cycle deterioration coefficient are stored in the RAM 53.

When the process shown in FIG. 6 starts, the CPU 51 determines whether the integrated discharged capacity stored in the RAM 53 is larger than the initial capacity (nominal capacity) stored in the ROM 52 (S11). If the integrated discharged capacity is smaller than the initial capacity (S11: NO), the CPU 51 ends this process. If the integrated discharged capacity not is smaller than the initial capacity (S11: YES), the CPU 51 subtracts the value of the initial capacity from the value of the integrated discharged capacity, and writes the subtracted value as new integrated discharged capacity (S12). Thus, the integrated value of the integrated discharged capacity is reset, and the integrating process restarts.

Subsequently, the CPU 51 writes a provisional value 1 as the cycle deterioration accelerating coefficient (S13). After that, the CPU 51 determines whether the setting voltage written in the ROM 52 is 4.2 V (S14). If the setting voltage is not 4.2 V (S14: NO), that is, if the setting voltage has been decreased, the cycle deterioration accelerating coefficient is changed to 0.7 (S15). Although the cycle deterioration accelerating coefficient is determined as 1 or 0.7 in accordance with a higher or lower value of setting voltage which can be set to one of two levels in this embodiment, the cycle deterioration accelerating coefficient may be increased/decreased in accordance with the increase/decrease of the setting voltage which can be set to one of three or more levels.

After Step S15 is completed, or if it is determined that the setting voltage is 4.2 V in Step S14 (S14: YES), the CPU 51 adds the corrected value of the increment (=1) of cycle number to the cycle number stored in the ROM 52 by the following equation (1) (S16) so that the cycle number is counted.

$$(\text{Cycle Number}) = (\text{Cycle Number}) + 1 \times (\text{Cycle Deterioration Accelerating Coefficient}) \qquad (1)$$

The increment of the cycle number is not limited to 1. For example, every when the counted cycle number is increased by n (n is two or more integers), the process shown in FIG. 6 may start. In this case, n is substituted for 1 in the equation (1).

Subsequently, the CPU 51 calculates the cycle deterioration coefficient by using linear interpolation based on the coordinates of the points A0 to A4 in FIG. 5 stored in the ROM 52, and the cycle number obtained as discussed above (S17). The CPU 51 stores the calculated value in the ROM 52. After that, this process ends.

In addition to the aforementioned deterioration with the increase of cycle number, the battery 1 deteriorates with an elapsed period of left-standing time (including storage time) in which the battery 1 is left standing or stored with having been charged. Calculation is now described which calculates a storage deterioration coefficient based on a counted period of storage time of the battery 1. The storage deterioration coefficient is a value representing the degree of deterioration of the battery 1.

In this embodiment, every when one hour elapses as the period of storage time of the battery 1, a predetermined process is performed for calculating the storage deterioration coefficient. However, this time interval is not limited to one hour.

Figure 7:
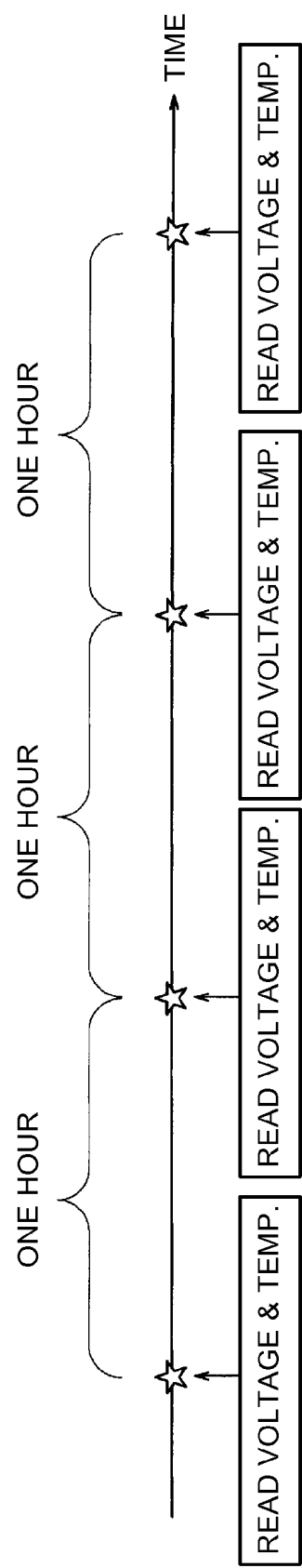
FIG. 7 is a chart illustrating a storage time period counting method for counting the period of storage time of a battery.

FIG. 7 is a chart illustrating a storage time period counting method for counting the period of storage time of the battery 1. The star marks shown in this figure indicate a point of the increment of the period of storage time to be stored in the ROM 52 (=one hour). The period of storage time is counted by accumulating the increments of the period of storage time. When one hour elapses since the increment of the period of storage time is added for obtaining the previous period of storage time, the temperature of the battery 1 (hereinafter, occasionally referred to as battery temperature) and the highest terminal voltage are read. The highest terminal voltage refers to the terminal voltage of one of the battery blocks B11, B12, and B13, which has the highest voltage. In other words, the highest terminal voltage refers to the terminal voltage of one of the battery cells 111, 112, 113, 121, 122, 123, 131, 132 and 133, which has the highest voltage (hereinafter, referred to as highest cell voltage). Again, the battery 1 is composed of the battery blocks B11, B12 and B13.

The relationship is now described between the period of storage time and the actual capacity of the battery 1.

Figure 8:
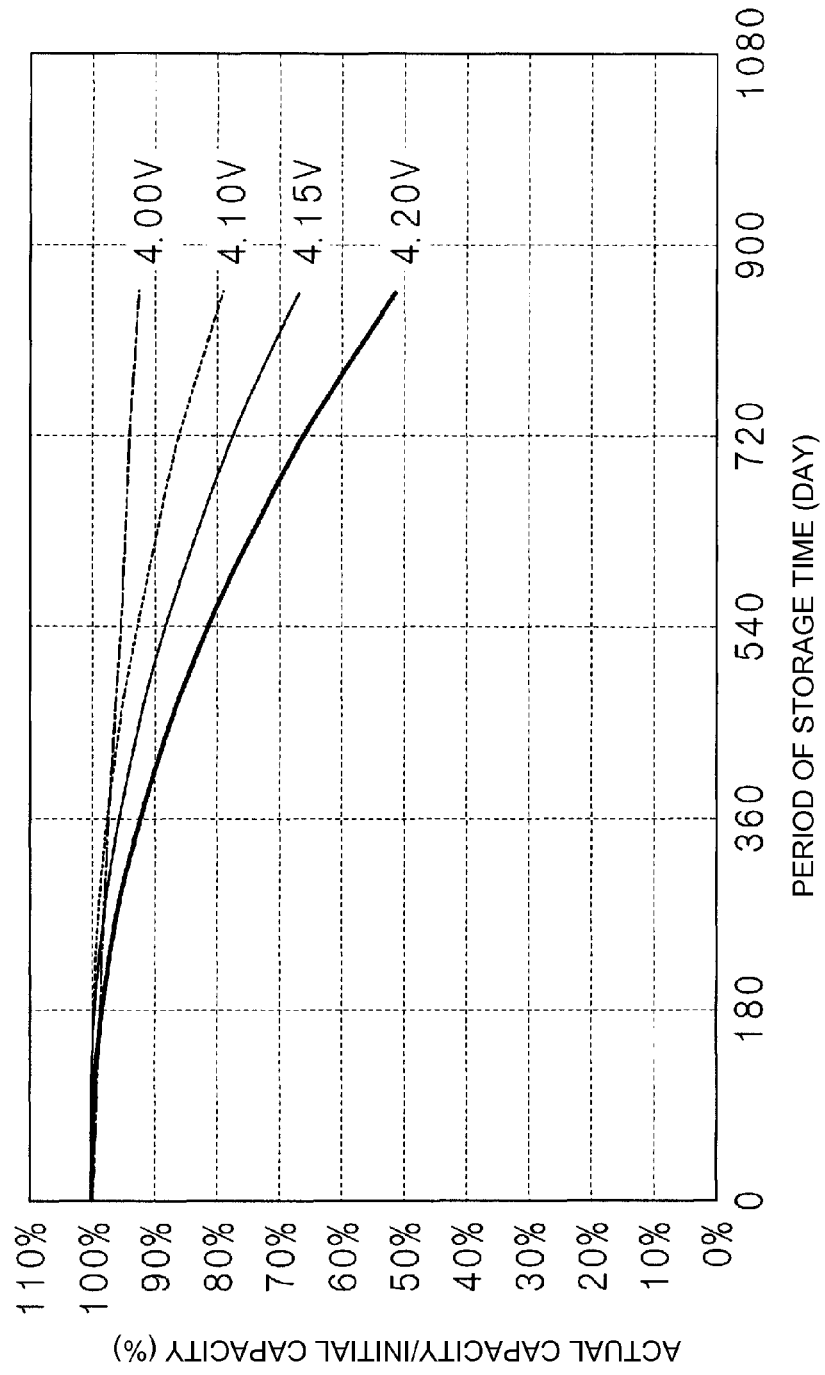
FIG. 8 is a graph showing the decrease of the actual capacity of a battery with the increase of the period of storage time of the battery.

FIG. 8 is a graph showing the decrease of the actual capacity of a battery with the period of storage time of the battery 1. The horizontal axis of FIG. 8 indicates the period of storage time. The vertical axis indicates the ratio of the actual capacity relative to the initial capacity. The heavy line, thin line, dashed line, and single-dot-dashed line in this figure indicate the highest cell voltage of 4.20 V, 4.15 V, 4.10 V, and 4.00 V, respectively.

As can be seen from FIG. 8, in the case where the highest cell voltage is set lower, it is possible to suppress the decrease of the actual capacity with the increase of the period of storage time (i.e., acceleration of deterioration state). As can be roughly seen from this figure, in the case where the highest cell voltage is decreased by 0.10 V, the period of storage time is increased about 1.5 times which brings the actual capacity to the same decreased ratio. In other words, in the case where the highest cell voltage is decreased by 0.10 V from a reference voltage, a ratio is decreased from 1.0 to a value in the range between 0.6 and 0.7 ($\approx$1/1.5), the ratio being represented by the acceleration of actual capacity decrease with the period of storage time (hereinafter referred to as storage deterioration accelerating coefficient). In this embodiment, the aforementioned reference voltage is roughly defined using a voltage range having a voltage width of 0.1 V. In the case where the highest cell voltage is not lower than 4.15 V, the storage deterioration accelerating coefficient is defined as 1. Accordingly, in the case where the highest cell voltage is set to a voltage in the range between 4.15 and 4.05 V, the storage deterioration accelerating coefficient is determined as 0.6, for example. In the case where the highest cell voltage is lower than 4.05 V, the storage deterioration accelerating coefficient is determined as a value smaller than 0.6. As discussed in another embodiment, in the case where the highest cell voltage is lower than 4.05 V, the storage deterioration coefficient may be determined as "0" (zero). The cell voltage as a predetermined terminal voltage corresponds to a predetermined remaining capacity (%). The predetermined remaining capacity (%) may be used instead of the predetermined terminal voltage.

Again, the storage deterioration accelerating coefficient is determined in accordance with a higher/lower value of the voltage range of the highest cell voltage. The reason is that timing of the determination corresponds to the fact that the battery is repeatedly charged by the control/power-supply portion 21 and discharged (discharged at a small amount of current) in the battery pack 10 during the period of storage time. Although the highest cell voltage steplessly varies, the storage deterioration accelerating coefficient can be easily determined in accordance with the highest cell voltage. The reason is that a higher/lower value of the storage deterioration accelerating coefficient corresponds to a higher/lower voltage range of the highest cell voltage.

The relationship is now described between the temperature and the age deterioration of the battery 1.

Figure 9:
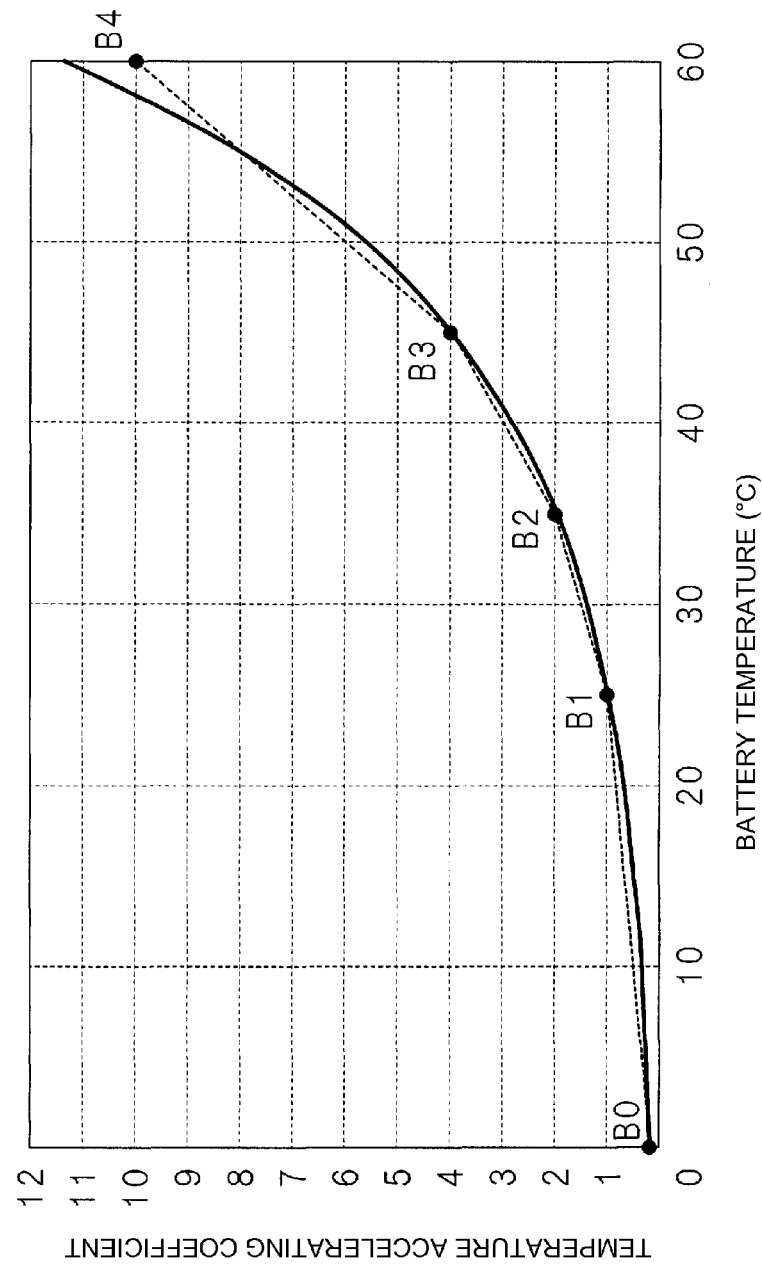
FIG. 9 is a graph showing that the age deterioration of a battery is accelerated higher with the increase of the temperature of the battery.

FIG. 9 is a graph showing that the age deterioration of the battery 1 is accelerated higher with the temperature of the battery 1. The horizontal axis of FIG. 9 indicates the battery temperature. The vertical axis indicates a ratio of the age deterioration of the battery 1 which is accelerated in accordance with the battery temperature (hereinafter, referred to as the temperature increase coefficient). The reference temperature of battery temperature is 25° C. The solid line in this figure shows a curved line adhering to the so-called "10° C. rise doubling rate low" (i.e., Arrhenius's law), while the dashed line is composed of straight-line segments which connect five points B0 to B4 on the curved line to each other, and approximately represents the curved line. In this embodiment, the coordinates of the points B0 to B4 are previously stored in the ROM 52 for calculation (or determination) of the temperature increase coefficient in accordance with the battery temperature. The temperature increase coefficient corresponding to any battery temperature can be calculated by linear interpolation.

However, there is a possibility that, as the period of storage time elapses, the highest cell voltage and the battery temperature are gradually changed. For this reason, the aforementioned storage deterioration accelerating coefficient and temperature increase coefficient are required to be determined every when the period of storage time is incremented. The storage deterioration accelerating coefficient and the temperature increase coefficient are defined as reference value of 1 in the case where the highest cell voltage falls within the voltage range between 4.20 and 4.15 V, and the battery temperature is 25° C. In the case where the highest cell voltage is lower than 4.15 V, and the battery temperature is not 25° C., the increment of the period of storage time is corrected by multiplying the reference increment of the period of storage time by a storage deterioration accelerating coefficient and a temperature increase coefficient which are determined in accordance with the highest cell voltage and the battery temperature at determination. Thus, the increment of the period of storage time in this case can be converted into the increment in case where the highest cell voltage falls within the voltage range between 4.20 and 4.15 V, and the battery temperature is 25° C. Thus, the increment to be accumulated is relatively set smaller as the highest cell voltage and battery temperature are lower. As a result, the accumulated value of the increments of the period of storage time becomes smaller, which in turn delays actual capacity decrease.

Calculation is now described which calculates the ratio of actual capacity relative to initial capacity (hereinafter, referred to as storage deterioration coefficient) based on the accumulated period of storage time which is obtained as in the case where the highest cell voltage falls within the voltage range between 4.20 and 4.15 V, and the battery temperature is 25° C.

Figure 10:
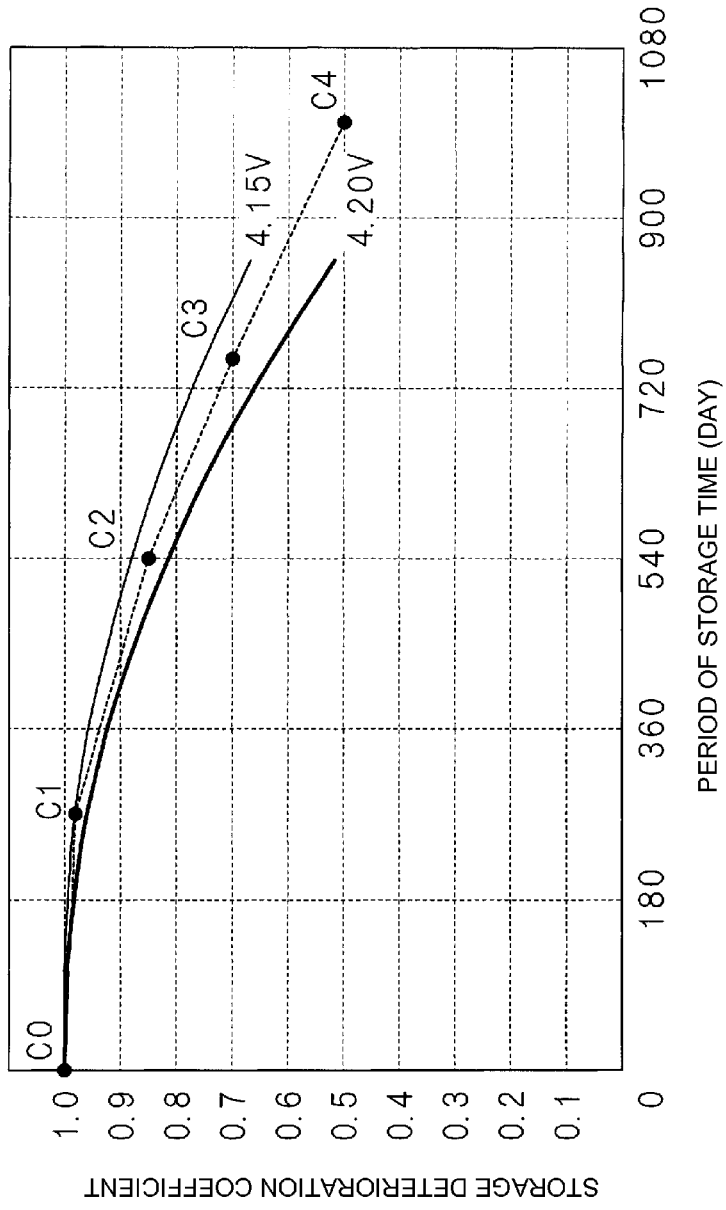
FIG. 10 is a graph schematically showing the decrease of storage deterioration coefficient with the increase of the period of storage time of a battery.

FIG. 10 is a graph schematically showing the decrease of storage deterioration coefficient with the period of storage time of the battery 1. The horizontal axis of FIG. 10 indicates the period of storage time. The vertical axis indicates the storage deterioration coefficient. The heavy line, and thin line, dashed line in this figure indicate highest cell voltage of 4.20 V, and 4.15 V, respectively. The dashed line is composed of straight-line segments which connect five points C0 to C4 to each other. Each of the five points C0 to C4 is arranged substantially at the midpoint between the heavy line and thin line. Thus, the dashed line approximately represents a curved line which extends along a midway line between the heavy line and thin line.

In the case where the load 22 does not operate, if the battery pack 10 is stored with being connected to the control/power-supply portion 21, the battery 1 is repeatedly brought between the fully-charged state and a state where the remaining capacity is 95% from one to another, for example. In this case, a line corresponding to the highest cell voltage repeatedly moves between the heavy line and thin line shown in FIG. 10 from one to another. Accordingly, it can be conceived that the line corresponding to the highest cell voltage in this case is represented by a line corresponding to a voltage value which is represented by the straight-line segments which connect the points C0 to C4 to each other (substantially 4.175 V). Needless to say, the aforementioned value "substantially 4.175 V" can be adjusted depending on control methods of the battery pack 10.

In this embodiment, the coordinates of the points C0 to C4 are previously stored in the ROM 52 for calculation of the storage deterioration coefficient in accordance with period of storage time. The storage deterioration coefficient corresponding to any value of period of storage time can be calculated by linear interpolation.

The aforementioned processes are now described in detail with reference to a flowchart.

Figure 11:
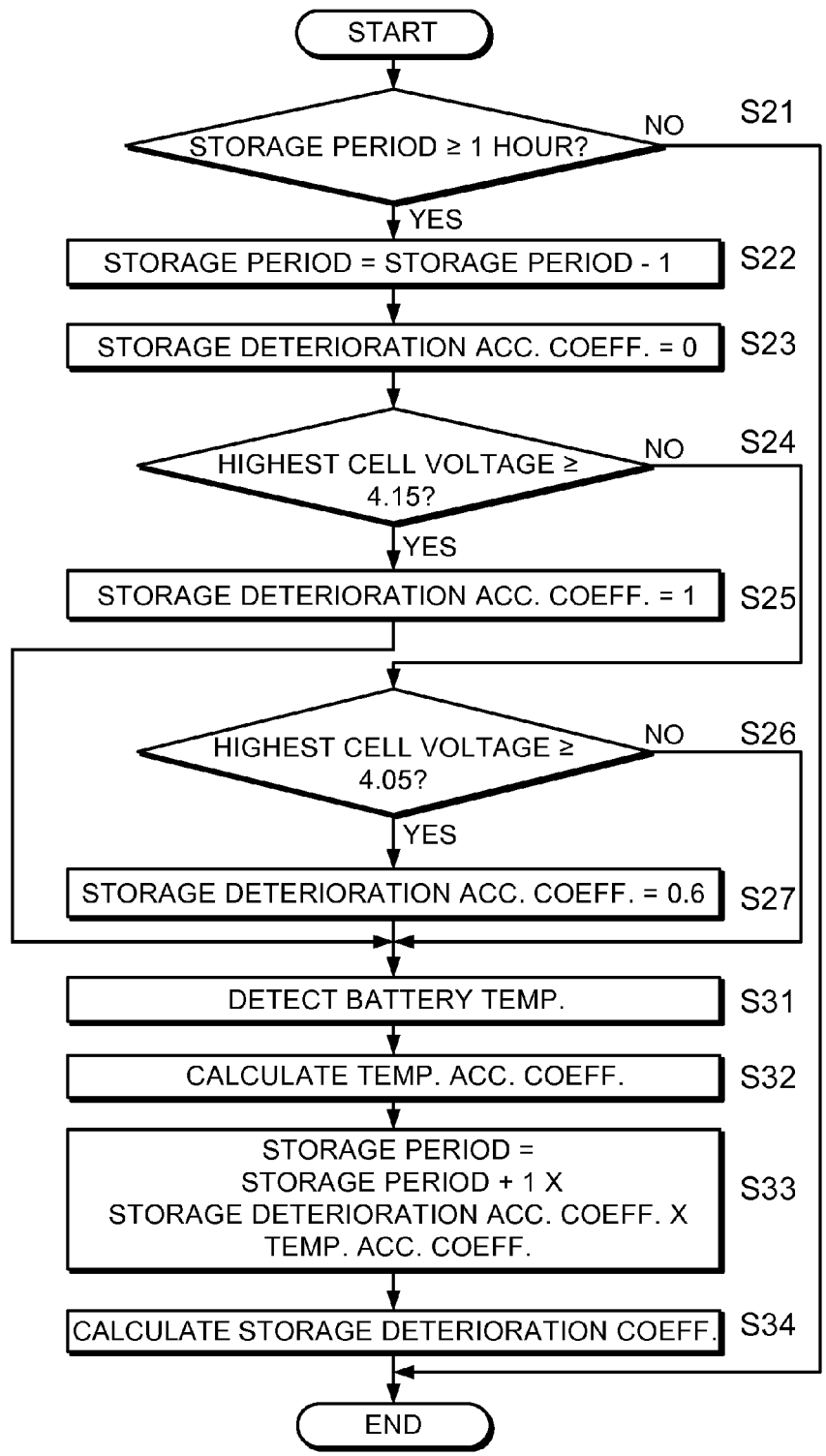
FIG. 11 is a flowchart showing the procedure of the CPU that calculates the storage deterioration coefficient every when the period of storage time is increased in increments of one hour.

FIG. 11 is the flowchart showing the procedure of the CPU 51 that calculates the storage deterioration coefficient every when the period of storage time is increased in increments of one hour. The process discussed below starts periodically at 250 ms, for example.

The storage time is obtained by accumulating time intervals in which the battery pack 10 is stored (left standing). For example, a process other than the following processes is performed periodically at 250 ms for accumulating the time intervals so that the accumulated value is stored in the RAM 53. The storage deterioration accelerating coefficient, the temperature increase coefficient, and the storage deterioration coefficient are stored in the RAM 53. The initial values of storage time and period of storage time are set to 0.

When the process shown in FIG. 11 starts, the CPU 51 determines whether the storage time stored in the RAM 53 is larger than one hour (S21). If the storage time is smaller than one hour (S21: NO), the CPU 51 ends this process. If the storage time is larger than one hour (S21: YES), the CPU 51 subtracts one hour from the value of storage time (S22). Thus, the storage time is reset, and the time interval accumulating process restarts.

Subsequently, the CPU 51 writes 0 as a provisional value of storage deterioration accelerating coefficient (S23), and determines whether the highest cell voltage read through the A/D conversion portion 4 is larger than 4.15 V (S24). If the highest cell voltage is equal to or larger than 4.15 V (S24: YES), the storage deterioration accelerating coefficient is set to 1 (S25). If the highest cell voltage is smaller than 4.15 V (S24: NO), the CPU 51 determines whether the highest cell voltage is larger than 4.05 V (S26). If the highest cell voltage is equal to or larger than 4.05 V (S26: YES), the storage deterioration accelerating coefficient is set to 0.6 (S27).

After the processing of Step S25 is completed, after the processing of Step S27 is completed, or if the highest cell voltage is smaller than 4.05 V in Step S26 (S26: NO), the CPU 51 detects the battery temperature (S31). The temperature increase coefficient is calculated based on the detected battery temperature and the coordinates of the points B0 to B4 in FIG. 9 (S32), and is then stored in the RAM 53. Subsequently, the CPU 51 adds the corrected value of increment (=1 hour) of period of storage time to the period of storage time stored in the ROM 52 (S33) by using the following equation (2) so that the period of storage time is counted.

$$\text{(Period of Storage Time)} = \text{(Period of Storage Time)} + 1 \times \text{(Storage Deterioration Accelerating Coefficient)} \times \text{(Temperature Increase Coefficient)} \quad (2)$$

Subsequently, the CPU 51 calculates the storage deterioration coefficient based on the accumulated period of storage time and the coordinates of the points C0 to C4 in FIG. 10 (S34), and stores the calculated storage deterioration coefficient in the RAM 53. After that, this process ends.

The process is now described which updates the setting voltage based on the cycle deterioration coefficient and the storage deterioration coefficient, every when the fully-charged state is detected. Again, the cycle deterioration coefficient is calculated in the process shown in FIG. 6. Also, again, the storage deterioration coefficient is calculated in the process shown in FIG. 11. However, this process for updating the setting voltage is not necessarily performed at timing of detection of the fully-charged state.

Figure 12:
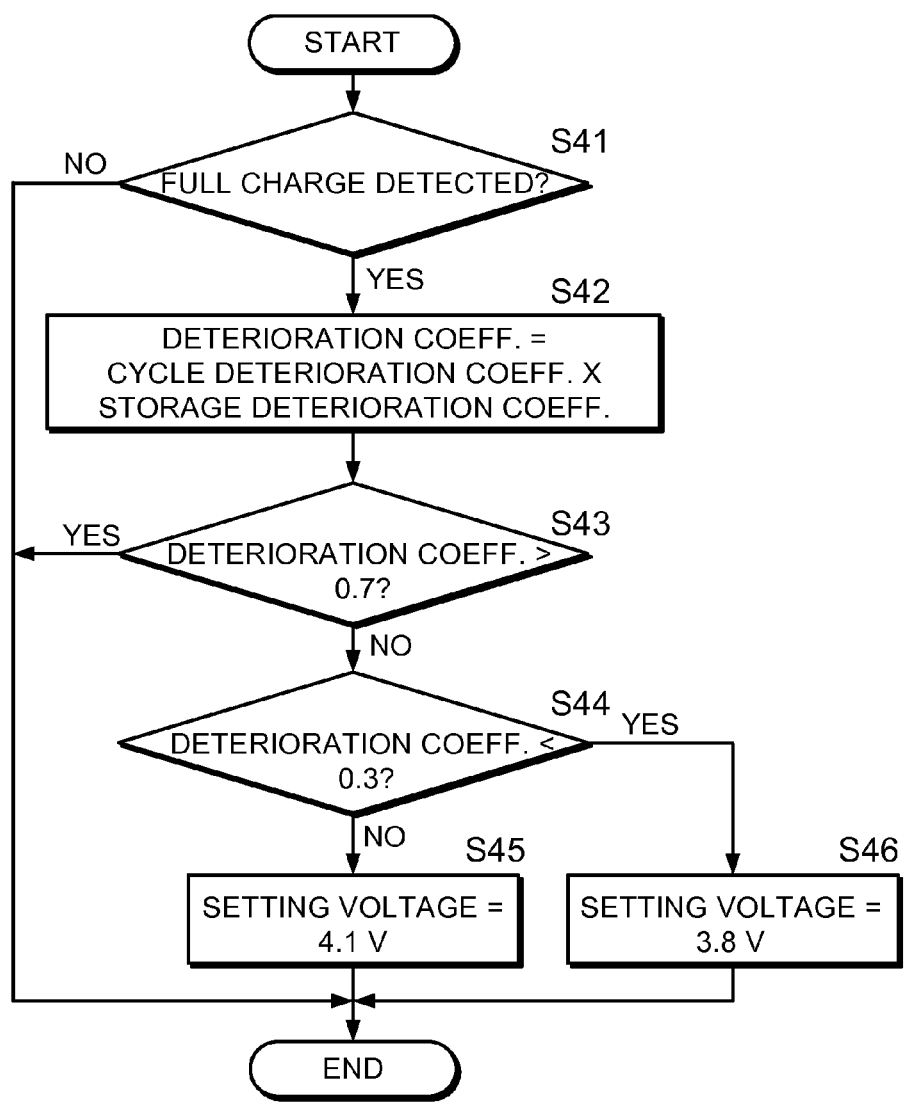
FIG. 12 is a flowchart showing the procedure of the CPU that calculates a deterioration coefficient and updates a setting voltage.

FIG. 12 is a flowchart showing the procedure of the CPU 51 that calculates the deterioration coefficient and updates the setting voltage. The process discussed below starts periodically at 250 ms, for example.

When the process shown in FIG. 12 starts, the CPU 51 determines whether the fully-charged state is detected in a charging operation process (not shown) (S41). If the fully-charged state is not detected (S41: NO), the process ends. If the fully-charged state is detected (S41: YES), the CPU 51 calculates the deterioration coefficient by using the following equation (3) (S42).

$$\text{(Deterioration Coefficient)} = \text{(Cycle Deterioration Coefficient)} \times \text{(Storage Deterioration Coefficient)} \quad (3)$$

Subsequently, the CPU 51 determines whether the calculated deterioration coefficient is larger than 0.7 (setting value) (S43). If the calculated deterioration coefficient is larger than 0.7 (S43: YES), the process ends. If the deterioration coefficient is not larger than 0.7 (S43: NO), the CPU 51 determines whether the deterioration coefficient is smaller than 0.3 (S44). If the deterioration coefficient is not smaller than 0.3 (S44: NO), that is, in the case where the deterioration coefficient is not lager than 0.7 and not smaller than 0.3, the CPU 51 decreases the setting voltage from 4.2 V to 4.1 V (S45). After that, the process ends. If the deterioration coefficient is smaller than 0.3 (S44: YES), the CPU 51 decreases the setting voltage to 3.8 V (S46). After that, the process ends.

In the case where the setting voltage for the next charging operation is thus decreased based on the calculated deterioration coefficient, if the difference becomes large between the actual capacity and FCC which is separately calculated for displaying the remaining capacity, FCC is required to be corrected.

Figure 13:
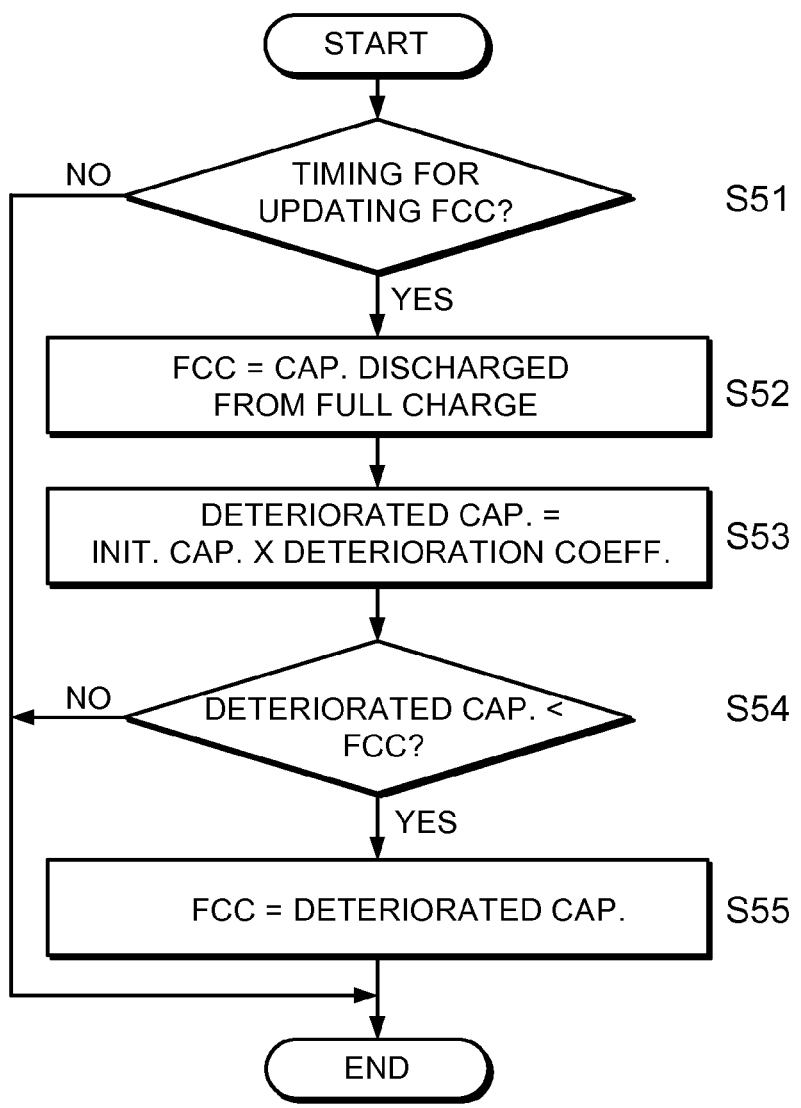
FIG. 13 is a flowchart showing the procedure of the CPU that sets FCC to a capacity which is calculated based on the deterioration coefficient.

FIG. 13 is a flowchart showing the procedure of the CPU 51 that changes FCC to a capacity which is calculated based on the deterioration coefficient. The process discussed below starts periodically at 250 ms, for example. A process other than the following process integrates the capacity which is continuously discharged from the fully-charged state. Such a process is performed periodically at 250 ms, for example.

When the process shown in FIG. 13 starts, the CPU 51 determines whether FCC is required to be updated (S51). Exemplary requirement for updating FCC is the case where, after the battery 1 is continuously discharged from the fully-charged state, the learning capacity is required to be updated (for example, the terminal voltage of one of the battery cell reaches a discharging stop voltage, the one of the battery cell having the lowest voltage among the battery cells 111, 112, 113, 121, 122, 123, 131, 132 and 133). If FCC is not required to be updated (S51: NO), the CPU 51 ends this process.

If FCC is not required to be updated (S51: YES), the CPU 51 provisionally sets FCC to the capacity which is continuously discharged from the fully-charged state (S52). Subsequently, the CPU 51 calculates a deteriorated capacity by using the following equation (4) (S53).

$$\text{(Deteriorated Capacity)} = \text{(Initial Capacity)} \times \text{(Deterioration Coefficient)} \quad (4)$$

Subsequently, the CPU 51 determines whether the calculated deteriorated capacity is smaller than FCC (S54). If the calculated deteriorated capacity is not smaller than FCC (S54: NO), the CPU 51 ends this process. In this case, FCC is set to the value calculated in a known manner. If the calculated deteriorated capacity is smaller than FCC (S54: YES), the CPU 51 sets FCC to the calculated deteriorated capacity (S55). After that, the process ends. Accordingly, the value of FCC is corrected to a value corresponding to the deterioration of the battery 1.

Consequently, effects are described which are obtained by decreasing the setting voltage based on the deterioration coefficient which is calculated as discussed above.

Figure 14:
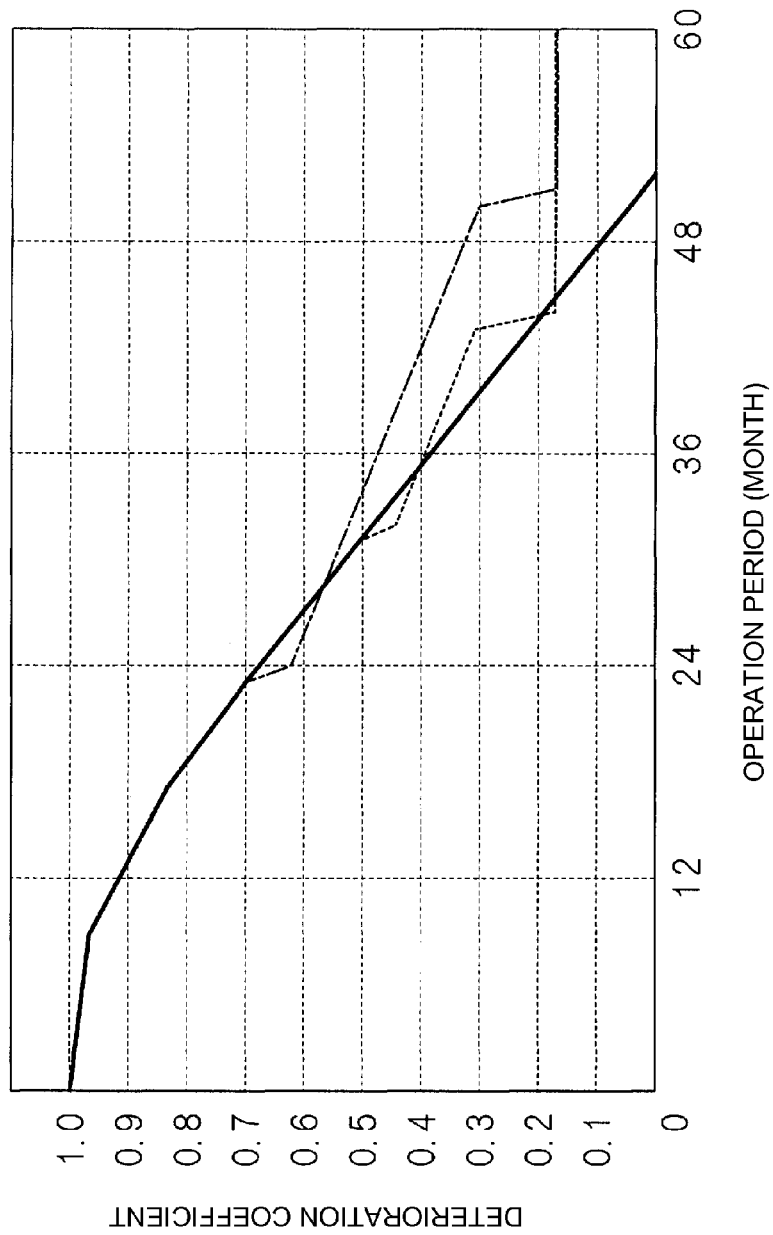
FIG. 14 is a graph of a simulation showing that the decrease of the deterioration coefficient is suppressed.

FIG. 14 is a graph of a simulation showing that the decrease of the deterioration coefficient is suppressed. The horizontal axis of FIG. 14 indicates operation period of the battery pack 10. The vertical axis indicates the deterioration coefficient. In this figure, the solid line shows the case where setting voltage is not decreased. The dashed line shows the case where the setting voltage is decreased to 4.10 V and to 3.80 V, when the deterioration coefficient decreases to 0.5 and to 0.3, respectively. The single-dot-dashed line shows the case where the setting voltage is decreased to 4.10 V and to 3.80 V, when the deterioration coefficient decreases to 0.7 and to 0.3, respectively. In this operation period, the operating condition of the battery pack 10 is assumed that a PC as the load device 20 is operated for about 50 hours a week, and one cycle of charging/discharging operation is performed every week. The temperature of the battery 1 in operation is 33° C. The temperature of the battery 1 not in operation is 23° C.

According to the result of the simulation shown in FIG. 14, as shown by the dashed line and single-dot-dashed line, it can be said that, in the cases where the setting voltage is decreased at first decreasing adjustment when the deterioration coefficient is decreased to 0.5 and 0.7, the periods can be increased by a half year and one year, respectively, in which the deterioration coefficient decreases to 0.3, relative to the case where the setting voltage is not decreased.

According to this embodiment, the cycle deterioration accelerating coefficient and the storage deterioration accelerating coefficient are determined which correspond to the increment (one cycle) of the cycle number and the increment (one hour) of the period of storage time of the battery pack. The increment of the cycle number is an index which increases with the operation amount of the battery pack. The increment of the period of storage time of the battery pack is an index which increases with elapsed time. Each of the one cycle and the one hour is corrected by multiplying each of the one cycle and the one hour by corresponding one of the determined deterioration accelerating coefficients. The corrected increments of each of the indices are accumulated. Each of the cycle deterioration coefficients and the storage deterioration coefficient is calculated in accordance with the accumulated value of each of cycle number and period of storage time. The setting voltage is decreased in accordance with the decrease of the product of the cycle deterioration coefficient and the storage deterioration coefficient.

Thus, the increment of each of the one cycle and the one hour is corrected in accordance with each of the determined cycle and the storage deterioration coefficients. Also, the corrected increments of each of the one cycle and the one hour are accumulated. Also, each of the determined cycle and the storage deterioration coefficients is changed to a lower/higher value in accordance with the higher/lower value of the accumulated value of each of the cycle number and the period of storage time. Also, the setting voltage is decreased in accordance with the product of the calculated deterioration coefficients. Accordingly, every when the setting voltage is decreased in accordance with deterioration degree, the cycle and storage deterioration accelerating coefficients corresponding to the calculated increments of the one cycle and the one hour are set smaller than the cycle and storage deterioration accelerating coefficients before the setting voltage is decreased in accordance with deterioration. In other words, the deterioration coefficients are determined so that the decrease rates of the cycle and storage deterioration coefficients with the increases of the cycle number and the period of storage time get smaller with the decrease of setting voltage.

Therefore, it is possible to suppress the deterioration of the rechargeable battery in consideration of the deterioration state that varies in accordance with the decrease of setting voltage.

If the product of the calculated deterioration coefficients of the cycle number and the period of storage time is smaller than 0.3, the setting voltage is decreased to voltage 3.8 V corresponding to a higher safety degree in charging operation.

In this case, if the deterioration of the rechargeable battery reaches a certain degree, the setting voltage is decreased to a large degree. As a result, it is possible to sufficiently the risk that safety problems arise.

Also, the determined deterioration accelerating coefficient corresponding to the increment of the charging/discharging cycle number is determined based on a factor that is changed to a higher/lower value in accordance with the higher/lower value of the setting voltage at timing of the determination.

According to this method, the deterioration coefficient of the rechargeable battery is calculated based on the setting voltage, and the charging/discharging cycle number, which is one of the indices which most greatly affect deterioration of the rechargeable battery. For this reason, the deterioration state of the rechargeable battery can be properly evaluated. As a result, it is possible to suppress the deterioration degree.

Also, the determined deterioration accelerating coefficient corresponding to the increment of the period of storage time is determined based on a factor that is changed to a higher/lower value in accordance with the higher/lower value of the terminal voltage at timing of the determination.

According to this method, the deterioration coefficient of the rechargeable battery is calculated based on the terminal voltage during the period of left-standing time, and the period of left-standing time, which is one of the indices which most greatly affect deterioration of the rechargeable battery. For this reason, the deterioration state of the rechargeable battery can be properly evaluated. As a result, it is possible to suppress the deterioration degree.

Also, the temperature increase coefficient is previously prepared which is changed to a higher/lower value in accordance with the higher/lower value of the temperature of the battery. The temperature of the battery is detected before the period of storage time is incremented every when the period of storage time is incremented, and the temperature increase coefficient is determined in accordance with the detected temperature of the battery. The increment of the period of storage time is corrected by multiplying the increment of the period of storage by the determined temperature increase coefficient and the storage deterioration accelerating coefficient, which is determined in accordance with the setting voltage.

According to this method, the calculation of the storage deterioration coefficient reflects the deterioration characteristics of the rechargeable battery that the deterioration degree gets higher with the battery voltage during the period corresponding to the increment of the period of left-standing time.

Although the deterioration coefficients are calculated corresponding to the cycle number and the period of storage time, and the setting voltage is decreased in this embodiment, the index to be used in the present invention is not limited to the cycle number or the period of storage time. Any index can be used which increases with the operation amount of the battery 1, or elapsed time.

Although the cycle deterioration accelerating coefficient and the storage deterioration accelerating coefficient are determined selectively from a plurality of values which are previously prepared in this embodiment, the present invention is not is not limited to this. The cycle deterioration accelerating coefficient and the storage deterioration accelerating coefficient can be calculated every when the cycle number and the period of storage time are incremented.

Although the setting voltage is decreased in accordance with the decrease of the product of the cycle deterioration coefficient and the storage deterioration coefficient in this embodiment, the setting current can be decreased together with the setting voltage (or instead of the setting voltage).

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2010-195900 filed in Japan on Sep. 1, 2010, the content of which is incorporated herein by reference.

What is claimed is:

1. A method for charging a rechargeable battery at a constant voltage and a constant current based on a setting voltage and a setting current, the method comprising:
   calculating an increment of each of one or more indices that increases with the operation amount of said rechargeable battery or elapsed time;
   determining a deterioration accelerating coefficient corresponding to the calculated increment of each of the indices;
   correcting the calculated increment of each of the indices by multiplying the calculated increment of each of the indices by the determined deterioration accelerating coefficient;
   accumulating the corrected increments of each of the indices;
   calculating each of one or more deterioration coefficients that is decreased in accordance with the increase of the accumulated value of the increments of each of the indices; and
   decreasing said setting voltage and/or said setting current in accordance with the decrease of the calculated deterioration coefficient.

2. The method according to claim 1, wherein if the calculated one deterioration coefficient, or the product of more than one deterioration coefficients is smaller than a predetermined value, said setting voltage is decreased to a predetermined voltage.

3. The method according to claim 1,
   wherein said indices include the number of charging/discharging cycles, and
   wherein the determined deterioration accelerating coefficient corresponding to the calculated increment of the number of charging/discharging cycles is changed to a higher/lower value in accordance with the higher/lower value(s) of said setting voltage and/or setting current.

4. The method according to claim 1,
   wherein said indices include the period of left-standing time in which the terminal voltage is not smaller than a predetermined terminal voltage, and
   wherein the determined deterioration accelerating coefficient corresponding to the calculated increment of the period of left-standing time is changed to a higher/lower value(s) in accordance with the higher/lower value of said terminal voltage.

5. The method according to claim 4, wherein the method further comprising:
   detecting the temperature of said rechargeable battery before accumulating the increments of said period of left-standing time every when accumulating the increments of said period of left-standing time;
   determining a temperature increase coefficient that is changed to a higher/lower value in accordance with the higher/lower value of the detected temperature; and
   further correcting the corrected increment of the period of left-standing time by multiplying the corrected increment of the period of left-standing time by the determined temperature increase coefficient, the corrected increment of the period of left-standing time having been corrected by multiplying the calculated increment of the period of left-standing time by said deterioration accelerating coefficient.

6. A battery pack for charging a rechargeable battery at a constant voltage and a constant current based on a setting voltage and a setting current, the battery pack comprising:
   an increment calculating portion that calculates an increment of each of one or more indices that increases with the operation amount of said rechargeable battery or elapsed time;
   a determining portion that determines a deterioration accelerating coefficient corresponding to the calculated increment of each of the indices, which is calculated by said calculating portion;
   a correcting portion that corrects the calculated increment of each of the indices by multiplying the calculated increment of each of the indices, which is calculated by said calculating portion, by the determined deterioration accelerating coefficient, which is determined by said determining portion;
   an accumulating portion that accumulates the corrected increments of each of the indices, which is corrected by said correcting portion;
   a deterioration coefficient calculating portion that calculates each of one or more deterioration coefficients that is decreased in accordance with the increase of the accumulated value of the increments of each of the indices, which is accumulated by said accumulating portion; and
   a decreasing portion that decreases said setting voltage and/or said setting current in accordance with the decrease of the calculated deterioration coefficient, which is calculated by said calculating portion.

7. The battery pack according to claim 6 further comprising:
   a cycle counting portion that counts the number of charging/discharging cycles of said rechargeable battery; and
   a time counting portion that counts the period of left-standing time in which said rechargeable battery is left standing with the terminal voltage being not smaller than a predetermined terminal voltage, wherein said indices include the number of charging/discharging cycles, which is counted by said cycle counting portion, and the period of left-standing time, which is counted by said time counting portion, wherein said determining portion changes the determined deterioration accelerating coefficient corresponding to the increment of said number of charging/discharging cycles to a higher/lower value in accordance with the higher/lower value(s) of said setting voltage and/or setting current, wherein said determining portion changes the determined deterioration accelerating coefficient corresponding to the increment of said period of left-standing time to a higher/lower value in accordance with the higher/lower value of said terminal voltage, and wherein the battery pack further comprises:
  a temperature detecting portion that detects the temperature of said rechargeable battery before said calculating portion accumulates the corrected increments of the period of left-standing time every when said calculating portion accumulates the corrected increments of the period of left-standing time;

a temperature increase coefficient determining portion that determines a temperature increase coefficient that is changed to a higher/lower value in accordance with the higher/lower value of the detected temperature, which is detected by said temperature detecting portion; and a corrected increment of period of left-standing time further correcting portion that further corrects the corrected increment of the period of left-standing time by multiplying the corrected increment of the period of left-standing time by the determined temperature increase coefficient, which is determined by said temperature increase coefficient determining portion, the corrected increment of the period of left-standing time having been corrected by said correcting portion.

* * * * *